United States Patent [19]
Kikkawa et al.

[11] Patent Number: 5,845,726
[45] Date of Patent: Dec. 8, 1998

[54] VEHICLE DRIVING FORCE CONTROL APPARATUS

[75] Inventors: Mitsuo Kikkawa; Masaru Shimizu; Yoshinori Taguchi; Tomomitsu Terakawa, all of Aichi, Japan

[73] Assignee: Aisin Seiki Kabushiki Kaisha, Kariya, Japan

[21] Appl. No.: 889,570

[22] Filed: Jul. 8, 1997

Related U.S. Application Data

[63] Continuation of Ser. No. 343,897, Nov. 17, 1994, abandoned.

[30] Foreign Application Priority Data

Nov. 19, 1993 [JP] Japan .................................. 5-291062

[51] Int. Cl.$^6$ .................................................. B60K 31/00
[52] U.S. Cl. ............................................. 180/178; 701/93
[58] Field of Search .................................. 180/178, 179, 180/170; 701/93

[56] References Cited

U.S. PATENT DOCUMENTS

| | | | |
|---|---|---|---|
| 4,862,852 | 9/1989 | Kamibayashi | 180/178 |
| 5,048,484 | 9/1991 | Terazawa et al. | 180/178 |
| 5,060,744 | 10/1991 | Katoh et al. | 180/178 |
| 5,107,948 | 4/1992 | Yamamoto | 180/179 |
| 5,128,869 | 7/1992 | Akishino et al. | 180/179 |
| 5,162,998 | 11/1992 | Kondo | 180/179 |
| 5,234,071 | 8/1993 | Kajiwara | 364/426.04 |
| 5,465,208 | 11/1995 | Mochizuki et al. | 180/170 |

FOREIGN PATENT DOCUMENTS

| | | |
|---|---|---|
| 58-50013 | 3/1983 | Japan . |
| 60-206950 | 10/1985 | Japan . |
| 61-50838 | 3/1986 | Japan . |

*Primary Examiner*—Anne Marie Boehler
*Attorney, Agent, or Firm*—Burns, Doane, Swecker & Mathis, LLP

[57] ABSTRACT

A vehicle driving force control apparatus which can reduce a driver's embarrassment at difference in accelerator feeling when the driver switches from a constant speed cruise mode to an ordinary variable speed drive mode, and which allows the use of engine brake even while constant speed cruise is requested. The apparatus comprises a switch for constant speed cruise, an accelerator sensor, a brake sensor, a current speed sensor, and a cruise condition judging function for deciding that cruise conditions are satisfied when constant speed cruise is requested, the accelerator pedal is not depressed, and the brake pedal is not depressed, and deciding that the cruise conditions are not satisfied in other cases. It updates target vehicle speed with current vehicle speed when the cruise conditions are not satisfied or on the instant when the cruise conditions are changed from dissatisfied to satisfied and sets controlled output so that current vehicle speed reaches the target vehicle speed. The controller also sets the controlled output when the cruise conditions are satisfied and selects controlled output based only on depression on the accelerator pedal by the driver when the cruise conditions are not satisfied. A throttle valve controls a sucked air amount of an engine based on the selected controlled output.

16 Claims, 7 Drawing Sheets

VEHICLE DRIVING FORCE CONTROL APPARATUS

This application is a continuation of application Ser. No. 08/343,897, filed Nov. 17, 1994 now abandoned.

BACKGROUND OF THE INVENTION

1. Field of the Invention

The present invention relates to a vehicle driving force control apparatus having a constant speed cruise function for allowing a vehicle to cruise at a constant speed.

2. State of the Art

In general, when driving a vehicle, a driver controls vehicle speed by switching depression on an accelerator pedal to depression on a brake pedal and vice versa quite frequently, and always depresses either of the pedals. This is quite a burden for the driver. To decrease the burden, vehicles having a constant speed cruise function have been developed in recent years. These sorts of vehicles are convenient because they can be driven without depressing an accelerator pedal. However, in these vehicles having a constant speed cruise function, setting of a target constant speed, acceleration, and deceleration require a driver to operate switches located near a driver's seat. Further, once a brake pedal is depressed, the constant speed cruise mode is canceled. Therefore, after the brake pedal is depressed, a constant speed cruise switch located near the driver's seat must be operated again. Accordingly, the operability is not sufficient. Loads on the driver even increase on a particularly congested road. As a result, the constant speed cruise function, even if provided, has often fallen into disuse.

Various techniques have been developed under these circumstances. Japanese Unexamined Patent Publication (KOKAI) No.50013/1983 discloses an apparatus as an attempt to overcome these disadvantages. In this apparatus, when a target vehicle speed is set and a brake pedal is once depressed to reduce vehicle speed and then completely released from the depression to be off, target vehicle speed is updated with the vehicle speed at the time when the brake pedal gets released from the depression, so that the vehicle cruises constantly at that reduced speed. Further, Japanese Unexamined Patent Publication (KOKAI) No.50838/1986 discloses an apparatus in which a slight depression on a brake pedal does not cancel a constant speed cruise function.

In the apparatus of the above two publications, even after the brake pedal is depressed, the constant speed cruise function is kept alive. There is no need to turn on a main switch for constant speed cruise near a driver's seat again, and accordingly the operability is improved. However, no regard is paid on constant speed cruise after an accelerator pedal is depressed for acceleration. In the apparatus of the above two publications, acceleration requires a driver to keep pressing an acceleration switch near the driver's seat, or to depress the accelerator pedal and then turn on a switch for constant speed cruise again.

An apparatus which maintains a constant speed cruise function after acceleration is disclosed in Japanese Unexamined Patent Publication (KOKAI) No. 206950/1985. In this apparatus, a relation between depressing pressure on an accelerator pedal by a driver and target vehicle acceleration is stored in a memory beforehand. Depressing pressure on the accelerator pedal by a driver is converted to target acceleration, and actual acceleration is calculated from vehicle speed variation during a sampling time, and when a difference exists between actual acceleration and target acceleration, timings of opening and closing a throttle valve are calculated in order to remove the difference, and based on that data a target throttle valve position is calculated and output to a servo driving means. When there is no depression on either of the accelerator pedal and the brake pedal, the constant speed cruise function is inevitably effected and troublesome switch operations are not required. In this apparatus, however, because depressing pressure on the accelerator pedal is converted into target vehicle acceleration, the relation between depressing pressure on the accelerator pedal and throttle valve positioning, namely, a driver's feeling about the accelerator pedal is different from that in driving a conventional vehicle having no constant speed cruise function. Therefore, when a driver switches from an ordinary vehicle to a vehicle of this kind, difference in accelerator feeling makes the driver embarrassed and causes a problem in safety.

Further, in this apparatus, since constant speed cruise control is always exercised during a drive, depression on the brake pedal is the only way to reduce vehicle speed, and accordingly safety is not secured in driving on a superhighway, a slippery road, a corner, or the like. Engine brake is required depending on circumstances.

In this apparatus, engine brake may be effected by providing a main switch for constant speed cruise and letting the driver turn off the main switch to get a variable speed drive. However, since the driving force control system changes from an acceleration conversion system to an ordinary system based on depressing pressure on the accelerator pedal, the relation between depressing pressure on the accelerator pedal and throttle valve positioning, namely, a driver's accelerator feeling changes drastically, which makes the driver embarrassed and causes a problem in safety.

SUMMARY OF THE INVENTION

The present invention has been developed in view of the above circumstances. It is therefore an object of the present invention to provide a vehicle driving force control apparatus which can ease a driver's embarrassment at difference in accelerator feeling, when the driver switches from a drive using a constant speed cruise function to a drive without using the cruise function, or when a driver switches from a car without a constant speed cruise function to a car having a constant speed cruise function, thereby increasing safety.

It is another object of the present invention to provide a vehicle driving force control apparatus which allows the use of engine brake if necessary, thereby increasing safety in driving on a downward slope, a superhighway, a slippery road, a corner or the like.

A vehicle driving force control apparatus according to the present invention comprises:

- means for requesting constant speed cruise of a vehicle;
- accelerator non-operation detecting means for detecting whether an accelerator pedal is not depressed by a driver;
- brake non-operation detecting means for detecting whether a brake pedal is not depressed by the driver;
- means for detecting current speed of the vehicle;
- cruise condition judging means for deciding that constant speed cruise conditions are satisfied when constant speed cruise is requested, the accelerator pedal is not depressed, and the brake pedal is not depressed, and deciding that the constant speed cruise conditions are not satisfied in other cases;
- means for updating target vehicle speed with the current vehicle speed detected by the vehicle speed detecting means, when the constant speed cruise conditions are not satisfied or on the instant when the constant speed cruise conditions are changed from dissatisfied to satisfied;

means for setting controlled output so that current vehicle speed reaches the target vehicle speed updated by the means for updating target vehicle speed;

control system switching means for selecting the controlled output set by the means for setting controlled output when the constant speed cruise conditions are satisfied, and selecting controlled output based on depressing pressure on the accelerator pedal by the driver when the constant speed cruise conditions are not satisfied; and means for controlling output of a driving source of the vehicle in accordance with the controlled output selected by the control system switching means.

FIG. 7 is a block diagram showing a basic construction of the apparatus according to the present invention.

The means for requesting constant speed cruise of a vehicle is operated by a driver or a car-loaded controller to request constant speed cruise of a vehicle, and this may employ a method in which actuation and stoppage are repeated alternately, or a method in which a switch for actuation and a switch for stoppage are provided separately. The accelerator non-operation detecting means is to detect physical quantity about non-operation of the accelerator pedal directly or indirectly. This may employ a method in which the operation of the accelerator pedal is directly detected, for example, by a potentiometer, an on-off switch, a depressing pressure sensor or the like, or a method in which the operation of the accelerator pedal is indirectly detected by detecting physical quantity such as engine speed, vehicle speed, a sucked air amount of an engine, aperture area of a throttle valve, and the like.

The brake non-operation detecting means is to detect physical quantity about non-operation of the brake pedal. This may employ a method in which the non-operation of the brake pedal is directly detected, for example, by a potentiometer, an on-off switch, a depressing pressure sensor, or the like, or a method in which the non-operation of the brake pedal is indirectly detected, for example, by a sensor for detecting on or off of a brake lamp, a sensor for detecting brake pressure, a vehicle speed sensor, or the like.

The means for detecting current speed of the vehicle is to detect physical quantity about vehicle speed, and can be constituted by a sensor for detecting wheel rotational speed, a sensor for detecting revolutional speed of a crankshaft, or the like.

The control system switching means is to select the controlled output set by the means for setting controlled output when the constant speed cruise conditions are satisfied, and to select controlled output based on depressing pressure on the accelerator pedal by the driver when the constant speed cruise conditions are not satisfied. This selection may be achieved by a mechanical linkage or an electric system.

The means for controlling output of a driving source is to control output of a vehicle driving source (an engine in the case of a gasoline or diesel automobile, a motor for travel in the case of an electric automobile) in accordance with the controlled output selected by the control system switching means. The means for controlling output of a driving source may be constituted by a throttle valve, a motor for operating a throttle valve, or the like in the case of a gasoline engine, a fuel injection apparatus in the case of a diesel engine, and a circuit for controlling voltage or electric current applied to a motor for travel in the case of an electric automobile.

The cruise condition judging means decides that constant speed cruise conditions are satisfied when constant speed cruise is requested, the accelerator pedal is not depressed, and the brake pedal is not depressed, and decides that the constant speed cruise conditions are not satisfied in other cases.

The means for updating target vehicle speed is to update target vehicle speed with the current vehicle speed detected by the vehicle speed detecting means. The means for setting controlled output is to set controlled output (a motor duty ratio, throttle aperture area for constant speed cruise, and the like) so that current vehicle speed reaches the target vehicle speed updated by the target vehicle speed updating means.

When the cruise conditions are satisfied, the control system switching means selects the controlled output set by the controlled output setting means. The driving source output control means controls output of a driving source of the vehicle in accordance with the controlled output thus selected.

When the cruise conditions are not satisfied, the control system switching means selects controlled output based on depressing pressure on the accelerator pedal by the driver. The driving source output control means controls output of a driving source of the vehicle in accordance with the controlled output thus selected.

Now, advantages of the present invention will be described hereinafter.

According to the apparatus of the present invention, once constant speed cruise is requested by the constant speed cruise requesting means, it is possible to accelerate a vehicle by depressing the accelerator pedal and then cruise constantly at that speed after acceleration. Further, even when the brake pedal is depressed for speed reduction, the constant speed cruise function is not canceled and when the brake pedal is released from the depression, the constant speed cruise function is automatically effected and the vehicle cruises constantly at that speed after deceleration. Therefore, operational loads on a driver can be decreased even on a congested road.

Further, according to the apparatus of the present invention, target vehicle speed is updated with current vehicle speed and the setting of a target throttle position for constant speed cruise is not based on acceleration in contrast to the apparatus disclosed in Japanese Unexamined Patent Publication (KOKAI) No.206950/1985. Therefore, it is possible to avoid change in accelerator feeling between a constant speed cruise mode and a variable speed drive mode on the base of depression on the accelerator pedal by a driver. Therefore, it is possible to ease the driver's embarrassment at difference in accelerator feeling when a driver switches from a drive using a constant speed cruise function to a drive without using the constant speed cruise function, or when a driver switches to a vehicle without a constant speed cruise function.

Further, in the apparatus according to the present invention, when the constant speed cruise function is inhibited by the constant speed cruise requesting means, or when the accelerator pedal or the brake pedal is depressed even in the case where constant speed cruise is requested, the cruise conditions are not satisfied. Therefore, the driving force control system is changed by the control system switching means to a system based on depressing pressure on the accelerator pedal by the driver, and the constant speed cruise mode is automatically interrupted. Therefore, engine brake or regenerative brake is secured, if necessary, and safety is increased in driving on a downward slope, a superhighway, a slippery road, a corner or the like.

Further, as long as the constant speed cruise is requested, the vehicle easily cruises at constant speed, and unnecessary depression on the accelerator pedal is prevented. Therefore, improvement in fuel consumption rate can be expected in the case of gasoline engine vehicles or diesel engine vehicles, and increase in travel distance can be expected in the case of electric vehicles.

BRIEF DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which.

DETAILED DESCRIPTION OF THE PREFERRED EMBODIMENTS

Now the present invention will be clarified in more detail by the following description of the preferred embodiments thereof to be taken in conjunction with the attached drawings.

The First Preferred Embodiment

Figure 1:
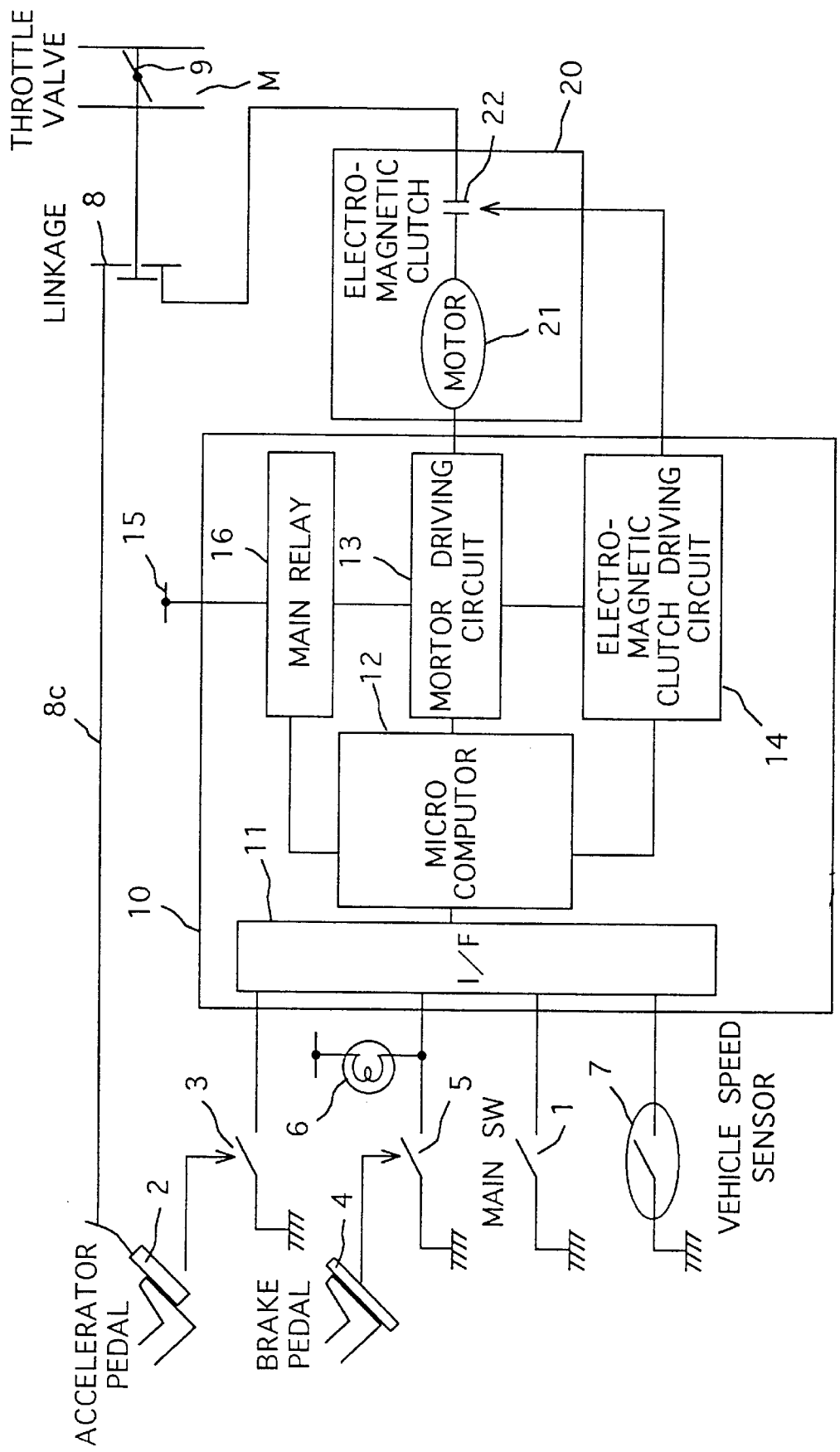
FIG. 1 is a block diagram of an apparatus according to a first preferred embodiment of the present invention.
Figure 2:
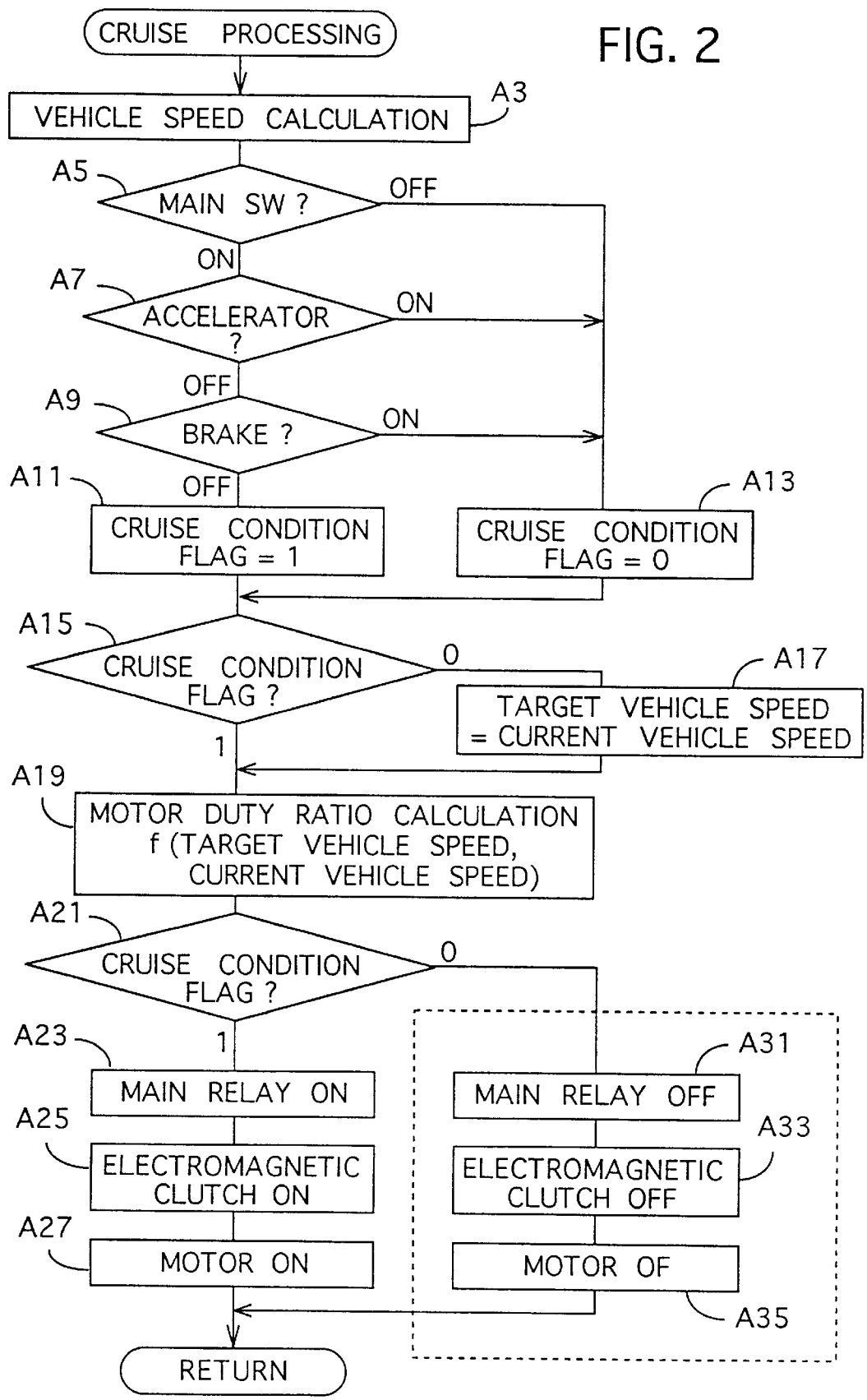
FIG. 2 is a flow chart of a constant speed cruise processing subroutine which a CPU of a controller executes according to the first preferred embodiment of the present invention.

FIG. 1 is a block diagram of a vehicle driving force control apparatus for a vehicle having a constant speed cruise function, according to a first preferred embodiment of the present invention. FIG. 2 is a flow chart of a constant speed cruise processing subroutine which a CPU of a controller executes.

As shown in FIG. 1, an on-off main switch 1 is provided as means for requesting constant speed cruise of a vehicle, an on-off accelerator sensor 3 as accelerator non-operation detecting means for detecting whether an accelerator pedal 2 is not depressed by a driver, an on-off brake sensor 5 as brake non-operation detecting means for detecting whether a brake pedal 4 is not depressed by the driver, a brake lamp 6 which is turned on by depression on the brake pedal 4, a vehicle speed sensor 7 as means for detecting current speed of the vehicle. The main switch 1 is located near a driver's seat.

When the accelerator pedal 2 is depressed by a driver, a throttle valve 9 is operated interlockingly through a cable 8c connected from the accelerator pedal 2, and a mechanical linkage 8, so that throttle aperture area is controlled to regulate a sucked air amount of an engine in a suction passage M.

The controller 10 comprises an input processing circuit 11, a microcomputer 12, a motor driving circuit 13, an electromagnetic clutch driving circuit 14, and a main relay 16 which feeds electric current to the microcomputer 12 and the circuits 13 and 14 from a battery 15. Signals from the accelerator sensor 3, the brake sensor 5, and the vehicle speed sensor 7 are input to the microcomputer 12 through the input processing circuit 11.

A cruise actuator 20 is operated for constant speed cruise, and provided with a motor 21 and an electromagnetic clutch 22. The motor 21 is operated by the motor driving circuit 13. The electromagnetic clutch 22 is operated by the electromagnetic clutch driving circuit 14. In ordinary driving, since the electromagnetic clutch 22 is off, depressing pressure on the accelerator pedal 2 by a driver is transmitted through the cable 8c and the mechanical linkage 8 to the throttle valve 9, thereby controlling the aperture area of the throttle valve 9. When a driver requests constant speed cruise by turning on the main switch 1 for cruise, the electromagnetic clutch 22 is actuated to connect the motor 21 and the throttle valve 9. Therefore, even if the driver does not depress the accelerator pedal 2, revolutional force of the motor 21 is transmitted to the throttle valve 9 through the electromagnetic clutch 22 so as to control the positioning of the throttle valve 9. No throttle sensor is provided in this preferred embodiment.

FIG. 2 is a flow chart of a constant speed cruise processing subroutine which the microcomputer 12 of the controller 10 executes. As shown in this figure, in step A3, current vehicle speed is calculated on the basis of signals from the vehicle speed sensor 7. In step A5, whether the main switch 1 is on or off is determined. When the main switch 1 is on, whether the accelerator pedal 2 is on or off is determined in step A7. When the accelerator pedal 2 is off, whether the brake pedal 4 is on or off is determined in step A9. When the brake pedal 4 is off, a cruise condition flag is set to 1 in step A11. The fact that the cruise condition flag is 1 means that constant speed cruise conditions are satisfied. The fact that the cruise condition flag is 0 means that the constant speed cruise conditions are not satisfied, i.e., that the constant speed cruise function is not exhibited. It must be noted that the turning on of an ignition switch in starting an engine resets the cruise condition flag to 0.

When the main switch 1 is determined to be off in step A5, when the accelerator pedal 2 is determined to be on in step A7, or when the brake pedal 4 is determined to be on in step A9, the program of the microcomputer 12 goes to step A13 where the cruise condition flag is set to 0 because the constant speed cruise conditions are not satisfied.

The program goes from step A11 or step A13 to step A15 where whether the cruise condition flag is 1 or 0 is identified. When the cruise condition flag is identified as 0, the program goes to step A17 where target vehicle speed is updated with the current vehicle speed calculated in step A3. When the cruise condition flag is identified as 1 in step A15, the program goes to step A19.

The program goes to step A19 also from step A17. In step A19, a motor duty ratio (controlled output) of the motor 21 is calculated from the target vehicle speed and the current vehicle speed.

Then, whether the cruise condition flag is on or off is identified in step A21 in order to switch control system. When the cruise condition flag is identified as 1, a mode of cruising constantly at the updated target vehicle speed is selected. That is to say, the main relay 16 is set on in step A23, the electromagnetic clutch 22 is set on in step A25, a control signal for driving the motor 21 is output in step A27, and the program returns to the main routine.

As a result, the throttle valve 9 is controlled on the basis of the motor 21 driven at the determined motor duty ratio, thereby allowing the vehicle to cruise at a constant speed.

When the cruise condition flag is identified as 0 in step A21, throttle control based on depressing pressure on the accelerator pedal 2 by the driver is selected. That is to say, the main relay 16 is set off in step A31, the electromagnetic clutch 22 is set off in step A33, and the motor 21 is set off in step A35. As described in the above, when the main relay 16 is off, the electromagnetic clutch 22 is off, and the motor 21 is off, the throttle valve 9 is controlled through the cable 8c and the mechanical linkage 8 on the base of depressing pressure on the accelerator pedal 2 by the driver, without depending on the motor 21.

In this preferred embodiment, once the main switch 1 is turned on to request constant speed cruise, the cruise condition flag 1 is set to 1 to allow the vehicle to cruise at a constant speed as long as the other conditions are satisfied, i.e., the accelerator pedal 2 is off and the brake pedal 4 is off.

While the accelerator pedal 2 is depressed for acceleration, since the cruise conditions are not satisfied, the cruise condition flag is set to 0 and the constant speed cruise function is not exhibited. Therefore, the throttle valve 9 is controlled through the cable 8c and the mechanical linkage 8 on the base of depressing pressure on the accelerator pedal 2 by the driver, and the vehicle speed is increased.

After that, when the accelerator pedal 2 is released from the depression to be off and the brake pedal 4 is kept off, the constant speed cruise conditions get satisfied. The cruise condition flag is set to 1 and the motor 21 controls the throttle valve 9 so as to keep the vehicle speed at the time when the cruise conditions get satisfied. Thus, the constant speed cruise function is exhibited.

When the brake pedal 4 is depressed during constant speed cruise, since the cruise conditions are not satisfied, the cruise condition flag is set to 0 and the constant speed cruise function is not exhibited. Accordingly, the vehicle speed is decreased on the base of depressing pressure on the brake pedal by the driver. After that, when the brake pedal is released from the depression to be off and the accelerator pedal is kept off, the constant speed cruise conditions get satisfied. The cruise condition flag is set to 1 and the motor 21 controls the throttle valve 9 so as to keep the vehicle speed at the time when the cruise conditions get satisfied. Thereby the constant speed cruise function is exhibited and the vehicle cruises at the constant speed.

Figure 3:
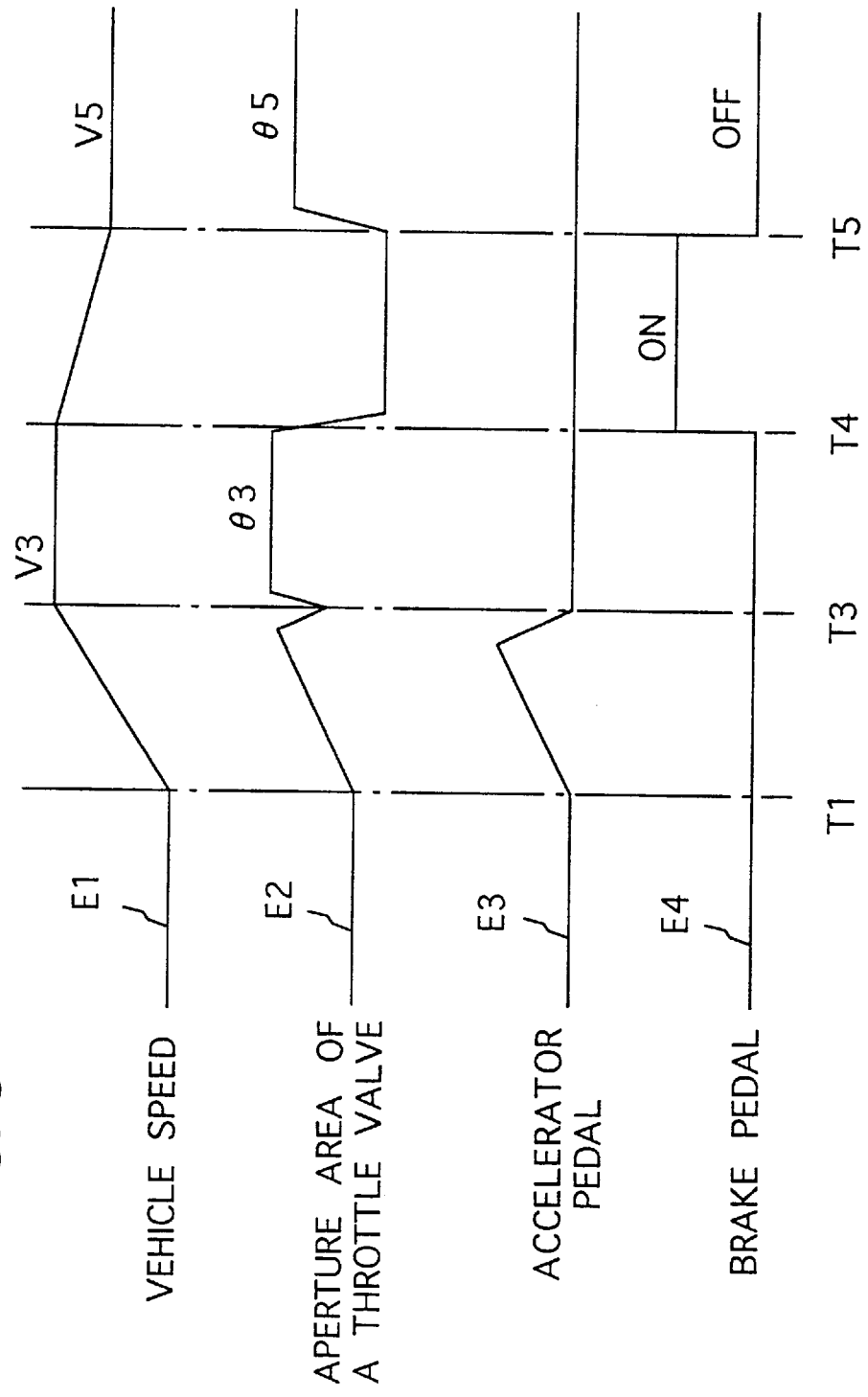
FIG. 3 is a timing chart of a constant speed cruise mode according to the first preferred embodiment of the present invention.

FIG. 3 is a timing chart showing a constant speed cruise mode after acceleration and that after deceleration while the main switch 1 for constant speed cruise is kept on. In FIG. 3, a characteristic curve E1 indicates vehicle speed, a characteristic curve E2 indicates aperture area of the throttle valve 9, a characteristic curve E3 indicates depressing pressure on the accelerator pedal 2, and a characteristic curve E4 indicates depressing pressure on the brake pedal 4.

First, as indicated by the characteristic curve E3, depression on the accelerator pedal 2 starts from time T1. At this time, the constant speed cruise mode is interrupted. Therefore, as indicated by the characteristic curve E2, the aperture area of the throttle valve 9 gradually increases from the time T1. As a result, as indicated by the characteristic curve E1, the vehicle speed gradually increases from the time T1. Then, as indicated by the characteristic curve E3, the accelerator pedal 2 is released from the depression to be off at time T3. Since the cruise conditions get satisfied upon the setting off of the accelerator pedal 2, the constant speed cruise function is exhibited and current vehicle speed at the time T3 is set as target vehicle speed for constant speed cruise. Accordingly, since the time T3, the vehicle cruises constantly at the speed V3 which the vehicle has at the time T3. At this time, the throttle position is maintained at theta 3.

Next, as indicated by the characteristic curve E4, the brake pedal 4 is depressed to be on at time T4. Since the cruise conditions get dissatisfied, the constant speed cruise mode is interrupted, and as indicated by the characteristic curve E2, the throttle valve position gets controlled in accordance with depression on the accelerator pedal 2. As indicated by the characteristic curve E1, current vehicle speed gradually decreases from the time T4.

Next, the brake pedal 4 is released from the depression to be off at time T5, the cruise conditions get satisfied, and thereby the constant speed cruise function is exhibited. Therefore, the current vehicle speed at the time T5 is set as target vehicle speed for constant speed cruise. From the time T5, the vehicle cruises constantly at the speed V5 which the vehicle has at the time T5. At this time, the throttle position is maintained at theta 5.

In summary, once a driver turns on the main switch 1 to request constant speed cruise, it is possible to increase vehicle speed by depressing the accelerator pedal 2 and make the vehicle cruise constantly at the increased speed. Further, even after the brake pedal 4 is depressed for deceleration, the constant speed cruise mode is not canceled, and upon the release of the brake pedal 4 from the depression, the constant speed cruise function is automatically recovered and the vehicle cruises constantly at the reduced speed. Therefore, in contrast to the conventional apparatus, there is no need to turn on the main switch 1 now and then on a congested road, and a driver's burden of switch operations can be decreased.

Further, target vehicle speed is updated with current vehicle speed and the setting of a target throttle position during constant speed cruise is not based on acceleration in contrast to the apparatus disclosed in Japanese Unexamined Patent Publication (KOKAI) No. 20695/1985. Therefore, it is possible to avoid change in accelerator feeling between a constant speed cruise mode and a variable speed drive mode on the base of depressing pressure on the accelerator pedal 2 by the driver.

By the way, in driving an ordinary vehicle, when a driver stops depressing the accelerator pedal 2, a throttle valve 9 is closed and engine brake is effected. On the other hand, in the apparatus of Japanese Unexamined Patent Publication (KOKAI) No.206950/1985, in the case where the main switch for constant speed cruise is on and the vehicle cruises at a constant speed, even when the depression of the accelerator pedal by a driver is set to be 0, engine brake cannot be effected because the throttle valve is kept open by the motor.

In this respect, the apparatus of this preferred embodiment secures safety by obtaining engine brake. When a driver turns off the main switch for the constant speed cruise to inhibit constant speed cruise or when a driver slightly depresses the accelerator pedal 2 to set the accelerator off even while the main switch 1 is on, the constant speed cruise conditions get dissatisfied. Therefore, the throttle control system is switched to one based on depressing pressure on the acceleration pedal 2 by the driver. That is to say, the constant speed cruise mode is automatically canceled or interrupted, and ordinary throttle control having an engine brake function is conducted.

The Second Preferred Embodiment

Figure 4:
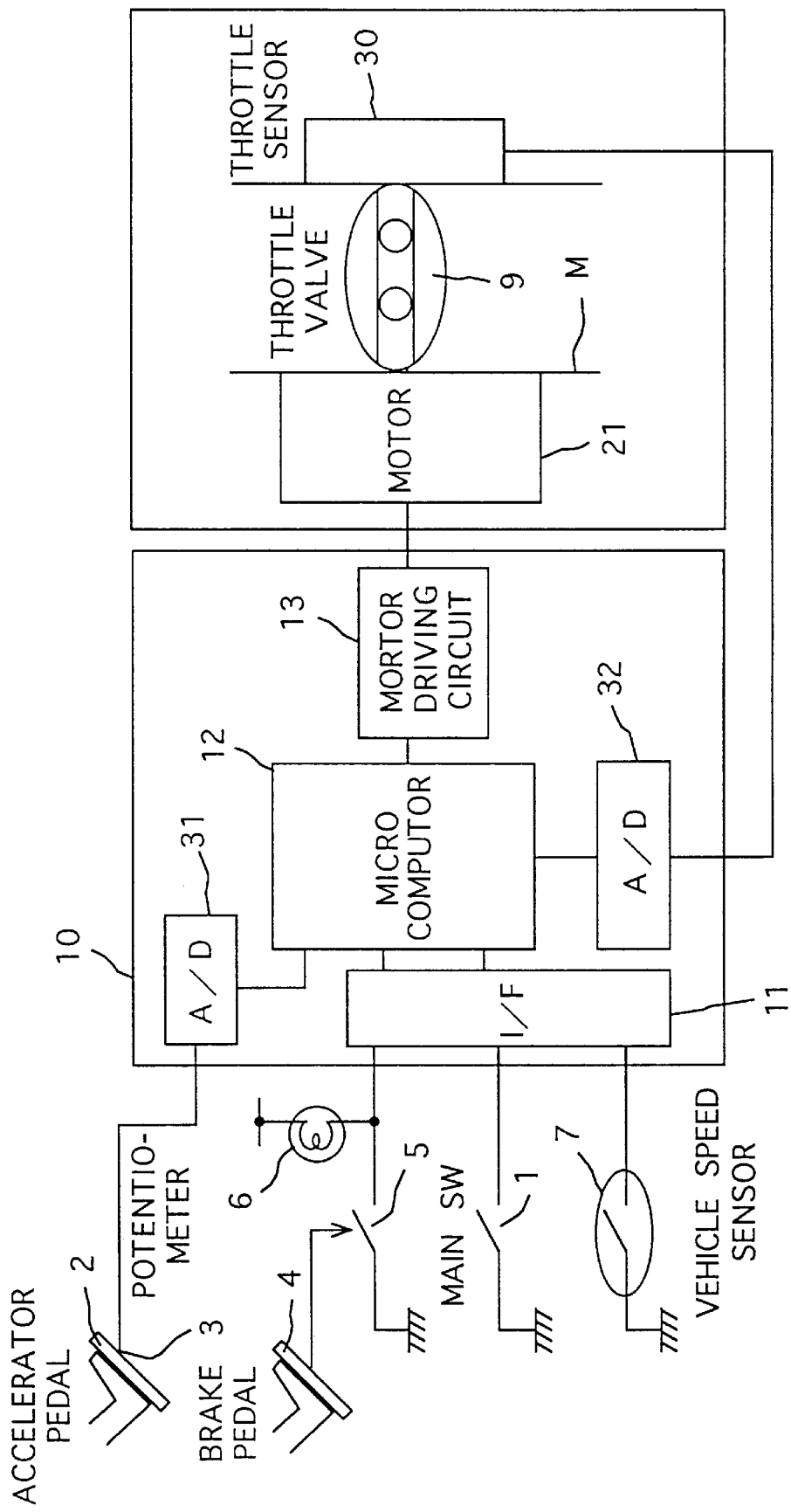
FIG. 4 is a block diagram of an apparatus according to a second preferred embodiment of the present invention.
Figure 5:
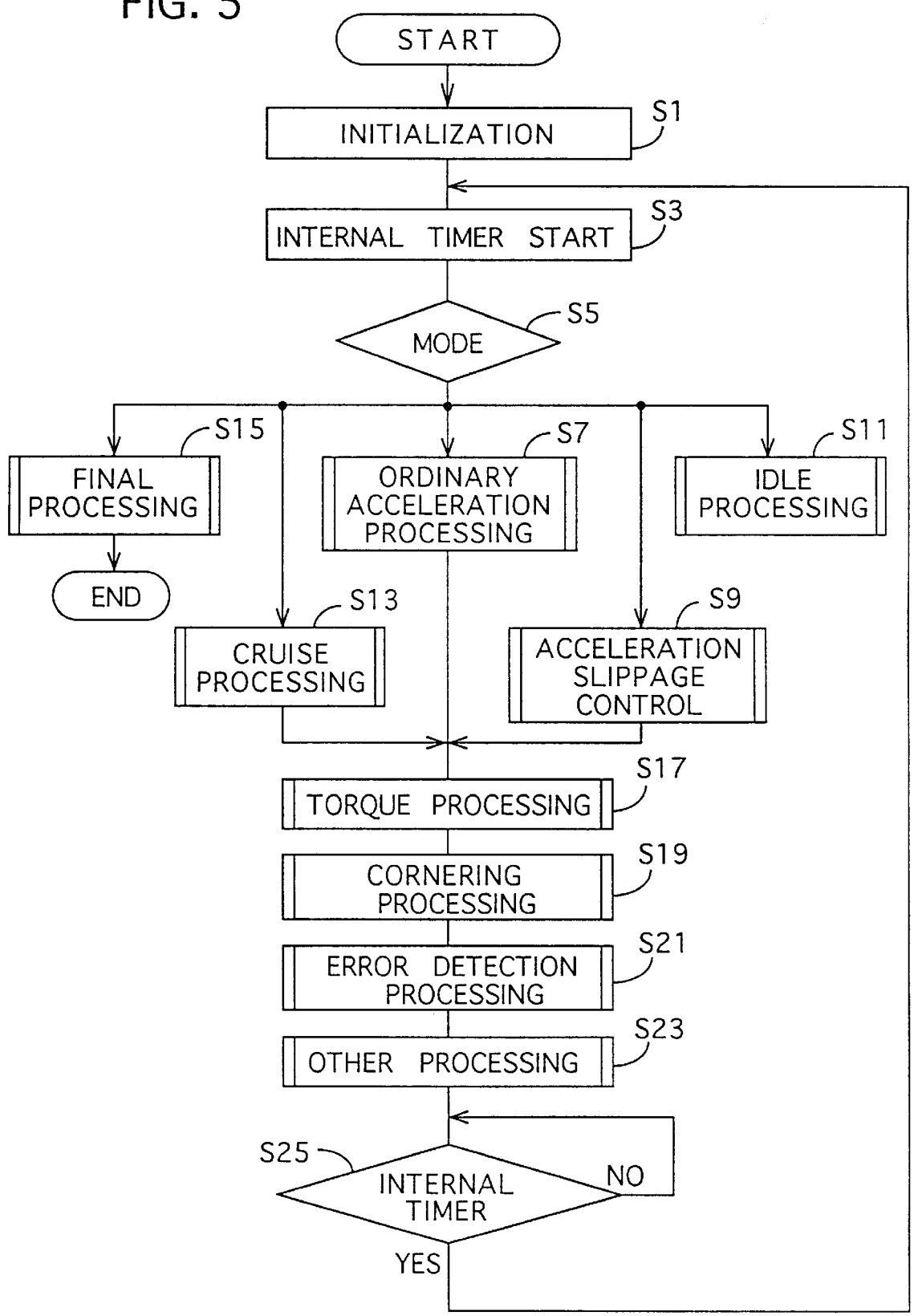
FIG. 5 is a flow chart of a main routine which a CPU of a controller executes according to the second preferred embodiment of the present invention.
Figure 6:
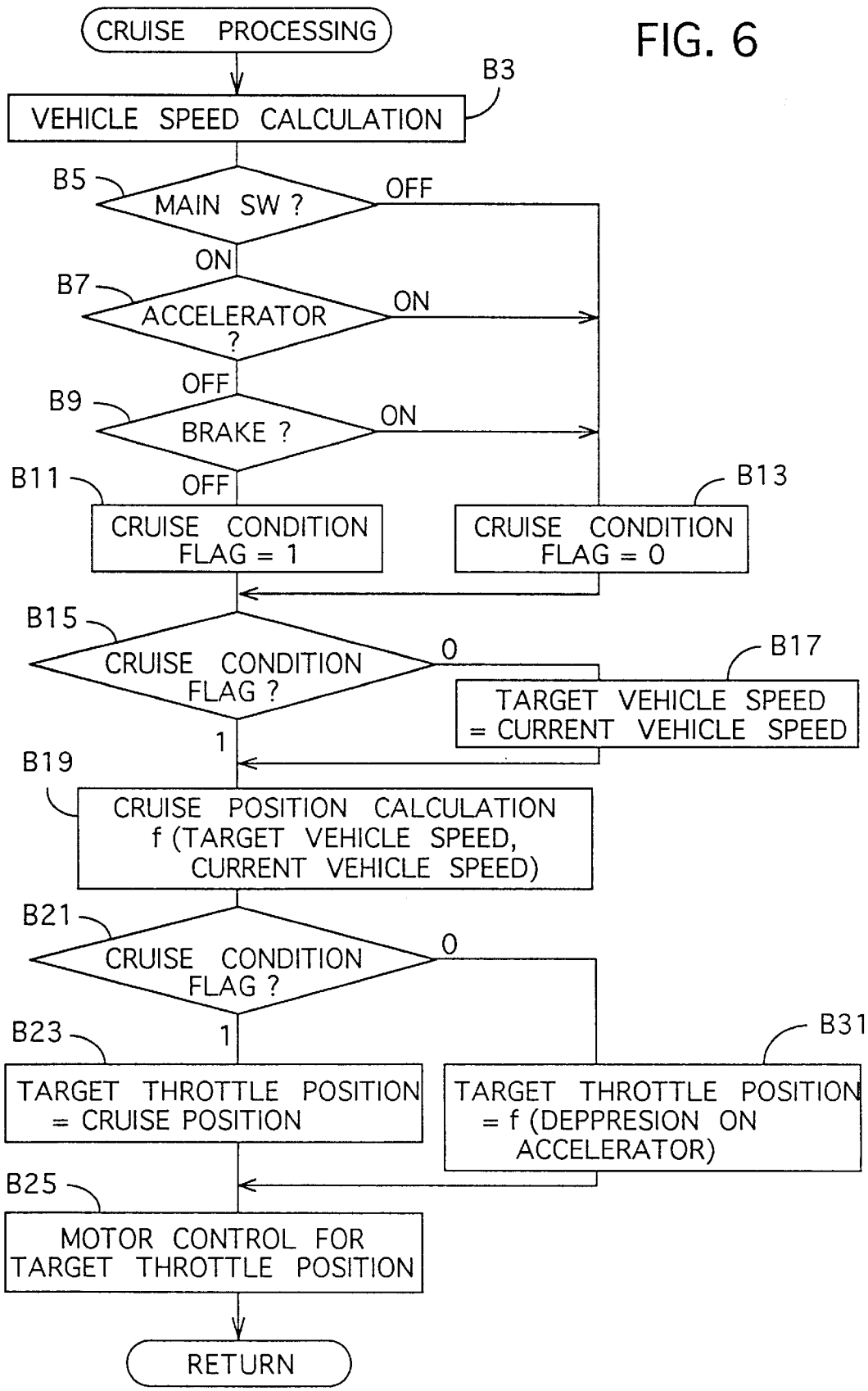
FIG. 6 is a flow chart of a constant speed cruise subroutine which the CPU of the controller executes according to the second preferred embodiment of the present invention.
Figure 7:
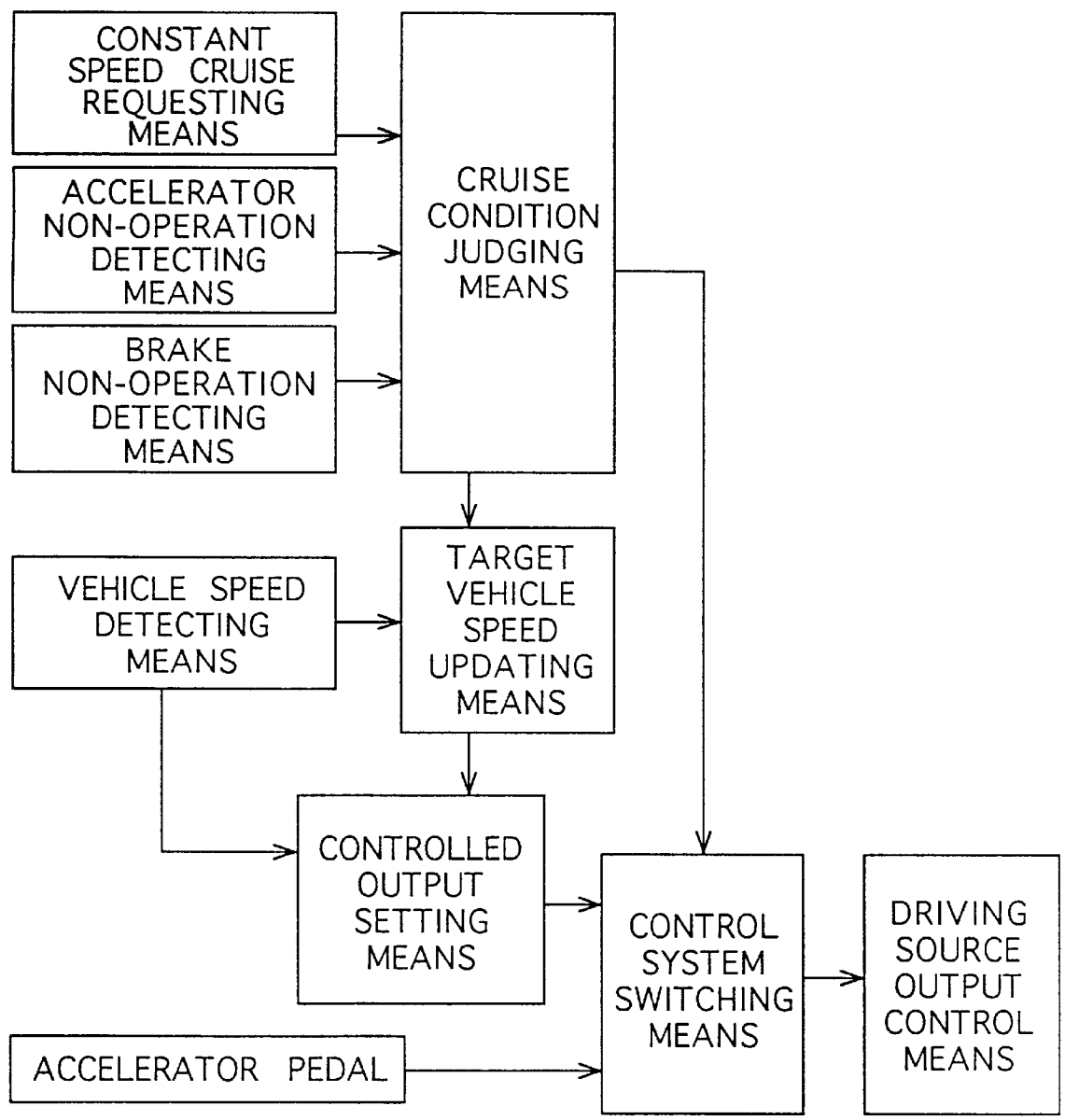
FIG. 7 is a block diagram showing a basic construction of the apparatus of the present invention.

FIG. 4 is a block diagram of an apparatus according to a second preferred embodiment of the present invention. FIG. 5 is a flow chart of a main routine which a CPU of a controller 10 executes according to the second preferred embodiment of the present invention. FIG. 6 is a flow chart of a constant speed cruise processing subroutine according to the second preferred embodiment of the present invention.

The apparatus of this preferred embodiment comprises a main switch 1, a potentiometer as an accelerator sensor 3, a brake sensor 5, a brake lamp 6, and a vehicle speed sensor 7.

In this preferred embodiment, a throttle valve 9 disposed in a suction passage M to the internal combustion engine is always operated by a motor 21. The position of the throttle valve 9 is detected by a throttle sensor 30.

A controller 10 comprises an A/D converter 31 which converts analog signals from the accelerator sensor 3 into digital signals, an input processing circuit 11 to which signals from the brake sensor 5, the main switch 1 and the vehicle sensor 7 are input, a microcomputer 12, a motor driving circuit 13, and an A/D converter 32 which converts analog signals from the throttle sensor 30 into digital signals.

The controller 10 controls the motor 21 on the base of signals which the accelerator sensor 3 outputs as a result of detection about depressing pressure on the accelerator pedal 2 by a driver. Revolutional force of the motor 21 is transmitted to the throttle valve 9 to operate the throttle valve 9.

As mentioned before, FIG. 5 shows a main routine which the microcomputer 12 of the controller 10 executes. In this figure, a program starts by turning on an ignition switch. First, initilization is executed, that is to say, a register and the like are all reset and a cruise condition flag is set to 0 in step S1. In step S3, an internal timer of the microcomputer 12, which counts time so that each routine is completed simultaneously, starts counting. In step S5, each mode is selected. An ordinary acceleration processing subroutine is executed in step S7. An acceleration slippage control subroutine is executed in step S9. An idle processing subroutine is executed in step S11. A cruise processing subroutine is executed in step S13. A torque processing subroutine is executed in step S17. A cornering processing subroutine is executed in step S19. An error detection subroutine is executed in step S21. Other processing subroutines are executed in step S23. The program goes back to step S3 upon termination of the counting by the internal timer. In the case of finishing the program, a final processing is executed in step S15.

The ordinary acceleration processing subroutine sets a target throttle position in accordance with depressing pressure on the accelerator pedal 2 by a driver. The acceleration slippage control subroutine detects wheel slippage in starting to move and controls a target throttle position so as to decrease slippage. The idle processing subroutine controls a target throttle position so as to keep idling speed of an internal combustion engine constant even when the situation changes, for example, the operation of an air conditioner is varied, during idling of the internal combustion engine. The torque processing subroutine controls a target throttle position so as to decrease shock in vehicle speed change. The cornering processing subroutine controls a target throttle position in accordance with a turned angle of a steering wheel.

The cruise processing subroutine controls the motor 21 so that the vehicle cruises at a constant speed even when the accelerator pedal is not depressed.

The cruise processing subroutine of this preferred embodiment is shown in FIG. 6. In step B3, vehicle speed is calculated on the base of signals from the vehicle speed sensor 7. In step B5, whether the main switch 1 is on or off is determined. When the main switch 1 is on, whether the accelerator pedal 2 is on or off is determined in step B7. When the accelerator pedal 2 is off, whether the brake pedal 4 is on or off is determined in step B9. When the brake pedal 4 is off, the cruise condition flag is set to 1 in step B11. It must be noted that as discussed above, the fact that the cruise condition flag is 1 means that the cruise conditions are satisfied, and the fact that the cruise condition flag is 0 means that the cruise conditions are not satisfied and that the constant speed cruise mode is canceled or interrupted.

When the main switch 1 is identified as off in step B5, when the accelerator pedal 2 is identified as on in step B7, or when the brake pedal 4 is identified as on in step B9, the program goes to step B13 where the cruise condition flag is set to 0 because the cruise conditions are not satisfied.

The program goes from step B11 or step B13 to step B15 where whether the cruise condition flag is 1 or 0 is determined. When the flag is 0, since the constant speed cruise is not conducted, the program goes to step B17 where target vehicle speed is updated with current vehicle speed. When the flag is 1, the program goes to step B19 on purpose to cruise at a constant speed. The program also goes from step B17 to step B19.

In step B19, a cruise position (controlled output) which is a throttle valve position for constant speed cruise is calculated from target vehicle speed and current vehicle speed. Then, whether the cruise condition flag is 1 or 0 is determined in step B21. When the flag is 1, the cruise position is set as a target throttle position in step B23 in order to obtain constant speed cruise. In step B25, the motor 21 is controlled so that the throttle valve 9 attains this target throttle position, and then the program returns to the main routine. In this case, if a difference exists between the throttle valve position detected by the throttle sensor 30 and the target throttle position, feedback control is exercised so that the current throttle position equals the target throttle position.

When the cruise condition flag is identified as 0 in step B21, since the constant speed cruise mode is canceled or interrupted, the program goes to step B31 where a target throttle valve position is set in accordance with a signal which the accelerator sensor 3 outputs based on depressing pressure on the accelerator pedal 2 by a driver. Then the program goes to step B25 and returns to the main routine.

Also in the second preferred embodiment, once the driver turns on the main switch 1 to select constant speed cruise, when the accelerator pedal 2 is depressed for increasing vehicle speed and then released from the depression to be off, the constant speed cruise conditions are satisfied and the vehicle cruises constantly at the increased speed. Further, even when the brake pedal 4 is depressed for speed reduction, the constant cruise function is not canceled, and as soon as the brake pedal 4 is released from the depression again, the cruise conditions get satisfied and the constant speed cruise function is automatically exhibited, that is, the vehicle cruises constantly at the speed after deceleration. Therefore, operational loads on a driver can be decreased even in driving on a congested road.

Further, since the setting of a target throttle position for constant speed cruise is not based on acceleration in the same way as the first preferred embodiment, it is possible to avoid change in accelerator feeling between a drive using the constant speed cruise function and a variable speed drive based on depressing pressure on the accelerator pedal 2 by a driver.

Further, when the main switch 1 is turned off to inhibit constant speed cruise, or when the accelerator pedal 2 is slightly depressed even while the main switch 1 is on, since the cruise conditions are not satisfied, the throttle valve control system is switched to a system based on depressing pressure on the accelerator pedal 2 by a driver, and the constant speed cruise function is automatically canceled or interrupted. Thus, ordinary throttle control having an engine brake function is effected, whereby safety is ensured.

Obviously, many modifications and variations of the present invention are possible in the light of the above teachings. Although the present invention has been applied to gasoline engines in the foregoing preferred embodiments, the present invention can be applied to diesel engines and electric vehicles. In the case where the present invention is applied to an electric vehicle, when the cruise conditions are not satisfied, the constant cruise function is automatically interrupted and regenerative brake, which corresponds to engine brake, is effected.

What is claimed is:

1. A vehicle driving force control apparatus comprising:

means for requesting constant speed cruise of a vehicle;

accelerator non-operation detecting means for detecting whether an accelerator pedal is not depressed by a driver;

brake non-operation detecting means for detecting whether a brake pedal is not depressed by the driver;

means for detecting a current speed of the vehicle;

cruise condition judging means for deciding that constant speed cruise conditions are satisfied when the constant speed cruise is requested, when the accelerator pedal is not depressed, and when the brake pedal is not depressed, and for deciding that the constant speed cruise conditions are dissatisfied in other cases;

means for updating a target vehicle speed with the current vehicle speed detected by said vehicle speed detecting means, when the constant speed cruise conditions are dissatisfied;

means for setting a controlled output so that the current vehicle speed reaches the target vehicle speed updated by said means for updating the target vehicle speed;

control system switching means for selecting the controlled output set by said means for setting controlled output when the constant speed cruise conditions are satisfied, and for selecting controlled output, regardless of depression of the brake pedal, based on only depressing pressure on the accelerator pedal by the driver when the constant speed cruise conditions are not satisfied; and means for controlling output of a driving source of the vehicle in accordance with the controlled output selected by said control system switching means.

2. A vehicle driving force control apparatus according to claim 1, further comprising a controller having a microcomputer, at least one of said cruise condition judging means, said means for updating target vehicle speed, said means for setting controlled output, and said control system switching means being achieved by said microcomputer of said controller.

3. A vehicle driving force control apparatus according to claim 1, wherein said means for controlling output of a driving source is a throttle valve for controlling a flow rate in a suction passage to an internal combustion engine.

4. A vehicle driving force control apparatus according to claim 1, further comprising:

a mechanical linkage which operates said means for controlling output of a driving source in accordance with depressing pressure on the accelerator pedal;

a cruise actuator which is used at the time of constant speed cruise;

clutch means for switching between an ordinary mode in which said mechanical linkage is connected to the accelerator pedal, and a constant speed cruise mode in which said mechanical linkage is connected to said cruise actuator; and a controller which operates said clutch means.

5. A vehicle driving force control apparatus according to claim 4, wherein said cruise actuator has a motor operated by said controller, and said clutch means is an electromagnetic clutch which connects said mechanical linkage and said motor.

6. A vehicle driving force control apparatus according to claim 5, wherein said means for setting controlled output sets a duty ratio of an electric current which flows in said motor.

7. A vehicle driving force control apparatus according to claim 5, wherein said controller has a motor driving circuit which drives said motor, and an electromagnetic clutch driving circuit which drives said electromagnetic clutch.

8. A vehicle driving force control apparatus according to claim 1, wherein said accelerator non-operation detecting means is an accelerator sensor for detecting depressing pressure on the accelerator pedal, and said apparatus further comprising:

a throttle valve for controlling aperture area of a suction passage to an engine;

a motor which is connected to said throttle valve and controls positioning of said throttle valve; and a controller which controls said motor in accordance with signals from said accelerator sensor.

9. A vehicle driving force control apparatus according to claim 8, wherein said accelerator sensor is a potentiometer and said controller has an A/D converter to which analog signals from said accelerator sensor are input, a microcomputer connected to said A/D converter, and a motor driving circuit which is operated by said microcomputer to drive said motor.

10. A vehicle driving force control apparatus according to claim 1, wherein said constant speed cruise requesting means is a switch located near a driver's seat.

11. A vehicle driving force control apparatus according to claim 1, wherein said accelerator non-operation detecting means is an accelerator sensor which detects depression on the accelerator pedal.

12. A vehicle driving force control apparatus according to claim 1, wherein said accelerator non-operation detecting means is a potentiometer which detects depression on the accelerator pedal.

13. A vehicle driving force control apparatus according to claim 1, wherein said brake non-operation detecting means is at least one of a brake sensor which detects depression on the brake pedal, and a brake lamp which turns on upon depression on the brake pedal and is off when the brake pedal is not depressed.

14. A vehicle driving force control apparatus according to claim 1, wherein said vehicle speed detecting means is a vehicle speed sensor which detects current vehicle speed of the vehicle.

15. A vehicle driving force control apparatus according to claim 3, further comprising a throttle sensor which detects positioning of said throttle valve.

16. A vehicle driving force control apparatus according to claim 2, wherein said microcomputer sets a constant speed cruise flag to one of 1 and 0 when the cruise conditions are satisfied and sets the constant speed cruise flag to the other of 1 and 0 when the cruise conditions are not satisfied.

* * * * *